(12) United States Patent
Rodriguez

(10) Patent No.: US 11,898,521 B1
(45) Date of Patent: Feb. 13, 2024

(54) EXHAUST MANIFOLD GASKET DEVICE

(71) Applicant: Martin Rodriguez, Mansfield, TX (US)

(72) Inventor: Martin Rodriguez, Mansfield, TX (US)

(*) Notice: Subject to any disclaimer, the term of this patent is extended or adjusted under 35 U.S.C. 154(b) by 0 days.

(21) Appl. No.: 18/220,003

(22) Filed: Jul. 10, 2023

(51) Int. Cl.
  *F02M 35/10* (2006.01)
  *F16J 15/06* (2006.01)
  *F16J 15/08* (2006.01)
  *F02F 11/00* (2006.01)

(52) U.S. Cl.
  CPC ...... *F02M 35/10144* (2013.01); *F16J 15/061* (2013.01); *F16J 15/0818* (2013.01); *F02F 11/00* (2013.01)

(58) Field of Classification Search
  CPC ............... F02M 35/10144; F16J 15/061; F16J 15/0818; F02F 11/00
  See application file for complete search history.

(56) References Cited

U.S. PATENT DOCUMENTS

| | | |
|---|---|---|
| 4,524,979 A | 6/1985 | Bauder |
| 5,095,867 A | 3/1992 | Inamura |
| 5,215,315 A * | 6/1993 | Belter ............... F02B 77/11 277/599 |
| 5,348,311 A | 9/1994 | Miyaoh |
| 5,375,851 A | 12/1994 | Mockenhaupt |
| D363,979 S | 11/1995 | Clark |
| 6,318,731 B1 | 11/2001 | Belter |
| 11,519,505 B2 | 12/2022 | Larson |
| 2012/0090565 A1* | 4/2012 | Beyer ............... F01N 3/046 123/41.82 R |
| 2015/0069720 A1* | 3/2015 | Nakamura ......... B21D 22/02 72/324 |
| 2019/0383231 A1* | 12/2019 | Ide ................... F02F 11/002 |

FOREIGN PATENT DOCUMENTS

WO    WO2011133200    10/2011

* cited by examiner

*Primary Examiner* — Syed O Hasan

(57) ABSTRACT

An exhaust manifold gasket device for precisely aligning a gasket for installation includes a gasket that has an exhaust hole and a coolant hole thereby facilitating the gasket to be positioned between an exhaust manifold and a cylinder head of an internal combustion engine. The gasket has a pair of locating slots each extending into the gasket to facilitate each of the locating slots to receive a respective head bolt in the exhaust manifold. In this way the gasket can be precisely aligned for final installation.

2 Claims, 3 Drawing Sheets

EXHAUST MANIFOLD GASKET DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gasket devices and more particularly pertains to a new gasket device for precisely aligning a gasket for installation. The device includes a gasket that has a pair of locating slots which each slide onto a pair of fasteners that are loosely installed between an exhaust manifold and a cylinder head of an internal combustion engine. In this way the gasket is precisely aligned for final installation.

(2) Description of Related Art Including Information Disclosed Under 37 CFR 1.97 and 1.98

The prior art relates to gasket devices including a variety of cylinder head gaskets that each include a plurality of exhaust openings and fastener holes and a cylinder head gasket that includes a plurality of exhaust openings and a pair of locating slots. In no instance does the prior art disclose an exhaust gasket that has a single exhaust opening and pair of locating slots to precisely locate the exhaust gasket for installation.

BRIEF SUMMARY OF THE INVENTION

An embodiment of the disclosure meets the needs presented above by generally comprising a gasket that has an exhaust hole and a coolant hole thereby facilitating the gasket to be positioned between an exhaust manifold and a cylinder head of an internal combustion engine. The gasket has a pair of locating slots each extending into the gasket to facilitate each of the locating slots to receive a respective head bolt in the exhaust manifold. In this way the gasket can be precisely aligned for final installation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
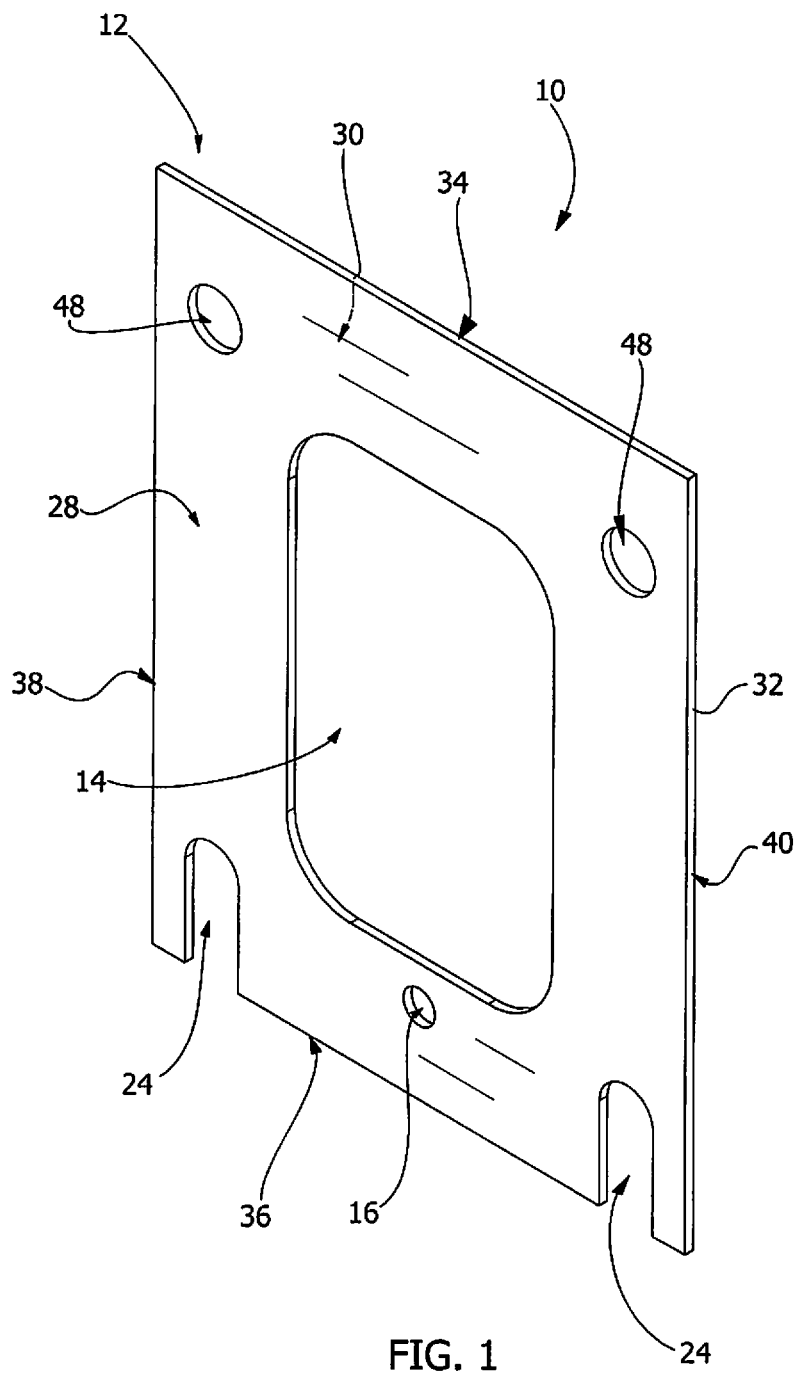
FIG. 1 is a front perspective view of an exhaust manifold gasket device according to an embodiment of the disclosure.
Figure 2:
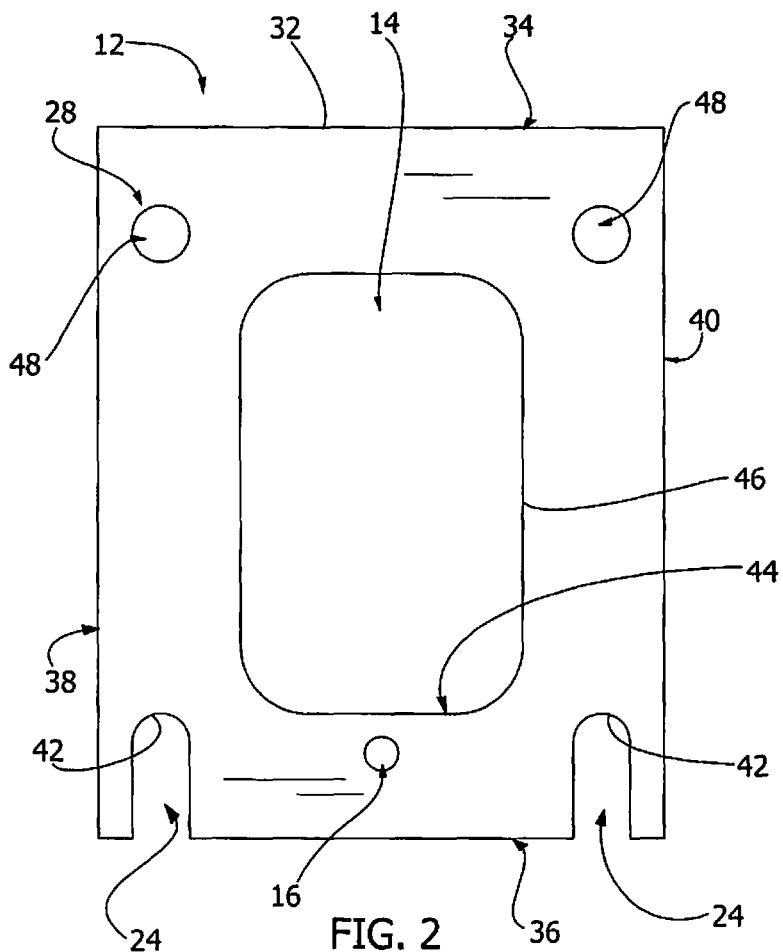
FIG. 2 is a front view of an embodiment of the disclosure.
Figure 3:
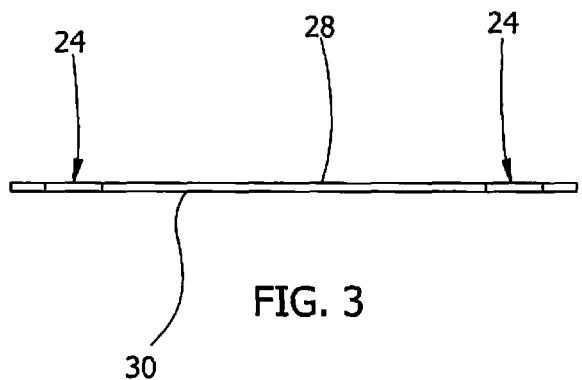
FIG. 3 is a bottom view of an embodiment of the disclosure.
Figure 4:
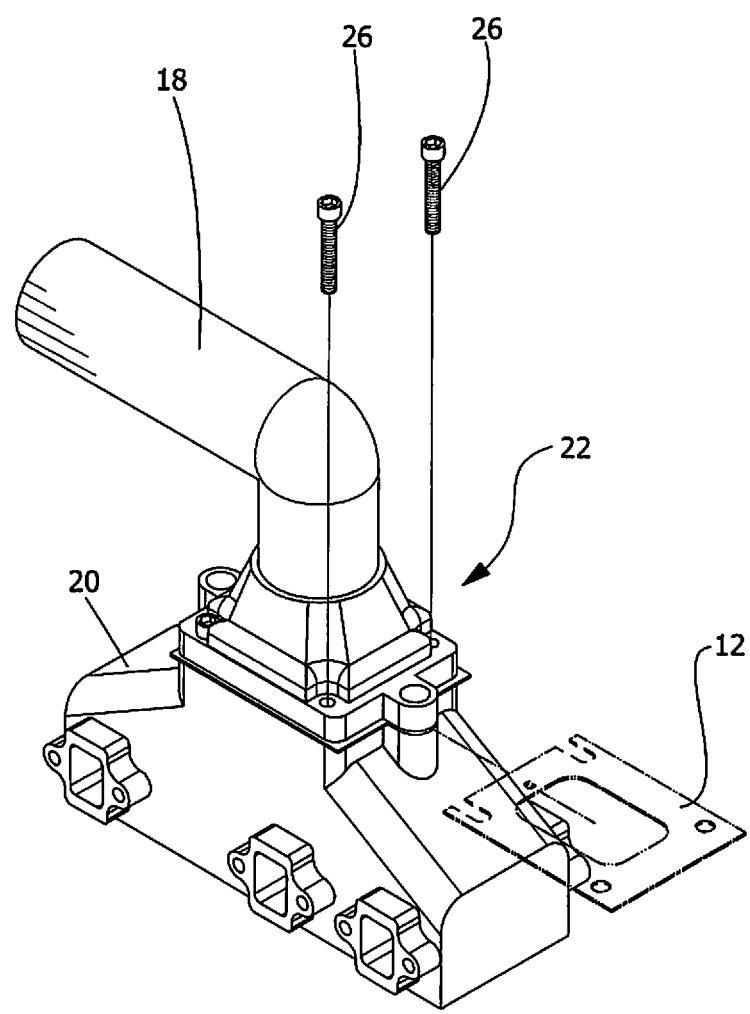
FIG. 4 is a perspective in-use view of an embodiment of the disclosure.

With reference now to the drawings, and in particular to FIGS. 1 through 4 thereof, a new gasket device embodying the principles and concepts of an embodiment of the disclosure and generally designated by the reference numeral 10 will be described.

As best illustrated in FIGS. 1 through 4, the exhaust manifold gasket device 10 generally comprises a gasket 12 that has an exhaust hole 14 and a coolant hole 16 thereby facilitating the gasket 12 to be positioned between an exhaust manifold 18 and a cylinder head 20 of an internal combustion engine 22. The internal combustion engine 22 may be of any conventional design that might be found in a passenger vehicle or a recreational vehicle. The gasket 12 has a pair of locating slots 24 each extending into the gasket 12 to facilitate each of the locating slots 24 to receive a fastener 26 in the exhaust manifold 18. In this way the gasket 12 can be precisely aligned for final installation.

The gasket 12 has a top surface 28, a bottom surface 30 and a perimeter edge 32 extending between the top surface 28 and the bottom surface 30; the perimeter edge 32 has a front side 34, a back side 36, a first lateral side 38 and a second lateral side 40. The exhaust hole 14 extends through the top surface 28 and the bottom surface 30 at a point that is centrally located on the gasket 12. The coolant hole 16 extends through the top surface 28 and the bottom surface 30 at a point that is located between the exhaust hole 14 and the back side 36 of the perimeter edge 32. Additionally, the coolant hole 16 is centrally positioned between the first lateral side 38 and the second lateral side 40 of the perimeter edge 32.

Each of the locating slots 24 extends from the back side 36 of the perimeter edge 32 toward the front side 34 of the perimeter edge 32 and each of the locating slots 24 is spaced from a respective one of the first lateral side 38 and the second lateral side 40 of the perimeter edge 32. Each of the locating slots 24 has a terminal end 42 that is rounded thereby facilitating the terminal end 42 of each of the locating slots 24 to conform to curvature of the respective fastener 26 when the gasket 12 is installed. The terminal end 42 of each of the locating slots 24 is aligned with a bottom side 44 of a bounding edge 46 of the exhaust hole 14. The gasket 12 has a pair of fastener holes 48 each extending through the top surface 28 and the bottom surface 30 of the gasket 12 and each of the fastener holes 48 is aligned with a respective one of the locating slots 24. Additionally, each of the fastener holes 48 is spaced from the front side 34 of the perimeter edge 32 of the gasket 12 and each of the fastener holes 48 is positioned between a front side 34 of the bounding edge 46 of the exhaust hole 14 and the front side 34 of the perimeter edge 32 of the gasket 12.

The gasket 12 may have a width of approximately 16.0 cm and a length of approximately 20.0 cm. The exhaust hole 14 may have a width of approximately 7.6 cm and a length of approximately 12.5 cm and the coolant hole 16 may have a diameter of approximately 9.5 mm. Each of the locating slots 24 may have a width of approximately 16.0 mm and a length of approximately 5.0 cm and each of the fastener holes 48 may have a diameter of approximately 16.0 mm. Each of the fastener holes 48 may be spaced approximately 16.0 mm front the front side 34 of the perimeter edge 32 of the gasket 12 and approximately 9.5 mm from a respective first lateral side 38 and second lateral side 40 of the perimeter edge 32 of the gasket 12. Additionally, each of the locating slots 24 may be spaced approximately 9.5 mm from the respective first lateral side 38 and second lateral side 40 of the perimeter edge 12 of the gasket 12.

In use, a pair of fasteners 26 is loosely installed between the exhaust manifold 18 and the cylinder head 20. The gasket 12 is slid between the exhaust manifold 18 and the cylinder head 20 to facilitate each of the fasteners 26 to slid into a respective one of the locating slots 24. In this way the gasket 12 is precisely aligned to facilitate the pair of fastener holes 48 to be positioned to receive additional fasteners 26 for the exhaust manifold 18. In this way the additional fasteners 26 can be installed in the exhaust manifold 18 and the fastener holes 48 and all of the fasteners 26 can be subsequently tightened to complete the installation of the exhaust manifold 18 onto the cylinder head 20.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An exhaust manifold gasket device to facilitate a gasket to be precisely located between an exhaust manifold and a cylinder head of an internal combustion engine prior to tightening fasteners, said device comprising:

a gasket having an exhaust hole and a coolant hole thereby facilitating said gasket to be positioned between an exhaust manifold and a cylinder head of an internal combustion engine, said gasket having a pair of locating slots each extending into said gasket to facilitate each of said locating slots to receive a respective head bolt in said exhaust manifold thereby facilitating said gasket to be precisely aligned for final installation, said gasket has a top surface, a bottom surface and a perimeter edge extending between said top surface and said bottom surface, said perimeter edge having a front side, a back side, a first lateral side and a second lateral side, said exhaust hole extending through said top surface and said bottom surface at a point being centrally located on said gasket, said coolant hole extending through said top surface and said bottom surface at a point being located between said exhaust hole and said back side of said perimeter edge, said coolant hole being centrally positioned between said first lateral side and said second lateral side of said perimeter edge, each of said locating slots extending from said back side of said perimeter edge toward said front side of said perimeter edge, each of said locating slots being spaced from a respective one of said first lateral side and said second lateral side of said perimeter edge, each of said locating slots having a terminal end being rounded thereby facilitating said terminal end of each of said locating slots to conform to curvature of said respective head bolt when said gasket is installed, said terminal end of each of said locating slots being aligned with a bottom side of a bounding edge of said exhaust hole, said gasket having a pair of fastener holes each extending through said top surface and said bottom surface of said gasket, each of said fastener holes being aligned with a respective one of said locating slots, each of said fastener holes being spaced from said front side of said perimeter edge of said gasket, each of said fastener holes being positioned between a front side of said bounding edge of said exhaust hole and said front side of said perimeter edge of said gasket.

2. An exhaust manifold gasket system to facilitate a gasket to be precisely located between an exhaust manifold and a cylinder head of an internal combustion engine prior to tightening fasteners, said system comprising:

an internal combustion engine having an exhaust manifold and a cylinder head; and a gasket having an exhaust hole and a coolant hole thereby facilitating said gasket to be positioned between said exhaust manifold and said cylinder head of said internal combustion engine, said gasket having a pair of locating slots each extending into said gasket to facilitate each of said locating slots to receive a respective head bolt in said exhaust manifold thereby facilitating said gasket to be precisely aligned for final installation, said gasket has a top surface, a bottom surface and a perimeter edge extending between said top surface and said bottom surface, said perimeter edge having a front side, a back side, a first lateral side and a second lateral side, said exhaust hole extending through said top surface and said bottom surface at a point being centrally located on said gasket, said coolant hole extending through said top surface and said bottom surface at a point being located between said exhaust hole and said back side of said perimeter edge, said coolant hole being centrally positioned between said first lateral side and said second lateral side of said perimeter edge, each of said locating slots extending from said back side of said perimeter edge toward said front side of said perimeter edge, each of said locating slots being spaced from a respective one of said first lateral side and said second lateral side of said perimeter edge, each of said locating slots having a terminal end being rounded thereby facilitating said terminal end of each of said locating slots to conform to curvature of said respective head bolt when said gasket is installed, said terminal end of each of said locating slots being aligned with a bottom side of a bounding edge of said exhaust hole, said gasket having a pair of fastener holes each extending through said top surface and said bottom surface of said gasket, each of said fastener holes being aligned with a respective one of said locating slots, each of said fastener holes being spaced from said front side of said perimeter edge of said gasket, each of said fastener holes being positioned between a front side of said bounding edge of said exhaust hole and said front side of said perimeter edge of said gasket.

* * * * *